(12) United States Patent
Fukuyama et al.

(10) Patent No.: US 11,371,635 B2
(45) Date of Patent: Jun. 28, 2022

(54) CONNECTOR AND ASSEMBLY METHOD FOR CONNECTOR

(71) Applicant: Sumitomo Riko Hosetex, Ltd., Ayabe (JP)

(72) Inventors: Takaki Fukuyama, Ayabe (JP); Satoshi Senda, Ayabe (JP); Shota Maeda, Ayabe (JP); Shimpei Goto, Ayabe (JP); Yuji Tokuda, Kobe (JP); Katsuji Miyata, Kobe (JP)

(73) Assignee: SUMITOMO RIKO HOSETEX, LTD., Ayabe (JP)

( * ) Notice: Subject to any disclaimer, the term of this patent is extended or adjusted under 35 U.S.C. 154(b) by 0 days.

(21) Appl. No.: 16/889,167

(22) Filed: Jun. 1, 2020

(65) Prior Publication Data

US 2020/0386356 A1 Dec. 10, 2020

(30) Foreign Application Priority Data

Jun. 5, 2019 (JP) .............................. JP2019-105207

(51) Int. Cl.
*F16L 37/10* (2006.01)
*F16B 7/20* (2006.01)

(52) U.S. Cl.
CPC ................ *F16L 37/10* (2013.01); *F16B 7/20* (2013.01)

(58) Field of Classification Search
CPC ..... F16L 37/10; F16L 2201/60; F16L 21/035; F16L 21/08; F16L 15/006; F16B 7/20

(Continued)

(56) References Cited

U.S. PATENT DOCUMENTS 808,219 A * 12/1905 Schroeder
5,072,971 A * 12/1991 Roman ................. F16L 37/252
285/88

(Continued)

FOREIGN PATENT DOCUMENTS

GB 190904892 A 8/1909
JP 2002-327881 A 11/2002

(Continued)

OTHER PUBLICATIONS

Aug. 24, 2021 Office Action issued in Chinese Patent Application No. 202010454021.6.

(Continued)

*Primary Examiner* — James M Hewitt, II
(74) *Attorney, Agent, or Firm* — Oliff PLC (57) ABSTRACT

To provide a connector that facilitates assembly while having a great axial-direction engagement force, a male joint member to be connected to a first member has a plurality of outer protrusions, and a female joint member to be connected to a second member has a plurality of inner protrusions. A circumferential-direction gap between adjacent two inner protrusions allows the outer protrusion to pass therethrough. The female joint member has, in an area opposed to inner protrusion back surfaces, a circular space that allows the plurality of outer protrusions to relatively rotate therein. The inner protrusion back surfaces of the plurality of inner protrusions are engaged in the axial direction with outer protrusion back surfaces of the plurality of outer protrusions that have passed through the circumferential-direction gaps between the plurality of inner protrusions.

14 Claims, 5 Drawing Sheets

(58) Field of Classification Search
USPC ........ 285/913, 396, 401, 402, 360, 362, 376
See application file for complete search history.

(56) References Cited

U.S. PATENT DOCUMENTS

| | | | |
|---|---|---|---|
| 5,094,491 A * | 3/1992 | Berghammer | F16L 19/005 285/92 |
| 7,559,583 B2 | 7/2009 | Stoetzer | |
| 2003/0057699 A1* | 3/2003 | Persohn | F16L 37/0887 285/39 |
| 2007/0254516 A1 | 11/2007 | Stoetzer | |
| 2015/0276110 A1 | 10/2015 | Parekh et al. | |

FOREIGN PATENT DOCUMENTS

| | | | |
|---|---|---|---|
| JP | 3725778 B2 | 12/2005 | |
| JP | 4437145 B2 | 3/2010 | |
| WO | 00/14445 A1 | 3/2000 | |

OTHER PUBLICATIONS

Feb. 14, 2022 Office Action issued in Chinese Patent Application No. 202010454021.6.

* cited by examiner

CONNECTOR AND ASSEMBLY METHOD FOR CONNECTOR

CROSS REFERENCE TO RELATED APPLICATIONS

This application claims priority based on Japanese Patent Application No. 2019-105207 filed on Jun. 5, 2016, the entire contents of which are incorporated by reference herein.

BACKGROUND OF THE INVENTION

1. Technical Field

The present invention relates to a connector and an assembly method for the connector.

2. Background Art

JP4437145B2 describes a structure for connecting a male joint member and a female joint member, and describes that the positions of the male joint member and the female joint member are fixed by a locking element interposed in a radial-direction interval between the male joint member and the female joint member. The locking element and the male joint member are fixed to each other in the axial direction by fitting between a radial-direction protrusion and a recess, and similarly, the locking element and the female joint member are fixed to each other in the axial direction by fitting between a radial-direction protrusion and a recess.

JP2002-327881A describes that splines are formed on fitting surfaces of a male joint member and a female joint member, and the male joint member and the female joint member are fitted to each other via a stopper. The stopper is held in a radial-direction interval between the male joint member and the female joint member, and is engaged with each joint member in the axial direction by being moved in the circumferential direction. The movement of the stopper in the circumferential direction is performed by screwing a screw as operation means through an elongated hole provided in the female joint member and then moving the screw using a tool.

JP3725778B2 describes that splines are formed on fitting surfaces of a male joint member and a female joint member, and the male joint member and the female joint member are tightened by screws.

SUMMARY OF INVENTION

However, in JP4437145B2, in order to increase the engagement force in the axial direction, stiffness of the locking element needs to be increased. As a result, fitting between protrusions and recesses of the locking element, a plug, and a socket becomes difficult. Thus, assembly needs to be performed using a tool. The same applies in the case of detaching the plug and the socket. In JP2002-327881A, in order to move the stopper in the circumferential direction, a tool and the like are needed. In JP3725778B2, a tool for tightening a screw is needed.

An object of the present invention is to provide a connector and an assembly method for the connector that facilitate assembly while having a great axial-direction engagement force.

(1. Connector)

A connector according to the present invention includes: a male joint member to be connected to a first member, the male joint member being formed in a tubular shape so as to allow fluid to flow therein; and a female joint member to be connected to a second member, the female joint member being formed in a tubular shape so as to allow fluid to flow therein, the female joint member being configured to be externally fitted to at least a part of the male joint member and engaged in an axial direction with the male joint member.

The male joint member has, on an outer circumferential surface thereof, a plurality of outer protrusions protruding outward in a radial direction and formed intermittently in a circumferential direction. The female joint member has, on an inner circumferential surface thereof, a plurality of inner protrusions protruding inward in the radial direction and formed intermittently in the circumferential direction.

Of each outer protrusion, a surface on a side to which the female joint member is inserted is defined as an outer protrusion front surface, and a surface on an opposite side of the outer protrusion front surface is defined as an outer protrusion back surface. Of each inner protrusion, a surface on a side to which the male joint member is inserted is defined as an inner protrusion front surface, and a surface on an opposite side of the inner protrusion front surface is defined as an inner protrusion back surface.

A circumferential-direction gap between adjacent two of the inner protrusions is formed so as to allow each outer protrusion to pass therethrough. The female joint member has, in an area opposed to the inner protrusion back surfaces, a circular space that allows the plurality of outer protrusions to relatively rotate therein. The inner protrusion back surfaces of the plurality of inner protrusions are engaged in the axial direction with the outer protrusion back surfaces of the plurality of outer protrusions that have passed through the circumferential-direction gaps of the plurality of inner protrusions.

$B_y$ the inner protrusion back surfaces of the female joint member being engaged in the axial direction with the outer protrusion back surfaces of the male joint member, the male joint member and the female joint member are engaged with each other in the axial direction. That is, the male joint member and the female joint member are directly engaged with each other not via another member such as a stopper. Thus, a high engagement force is obtained.

Operation for engaging the outer protrusion back surfaces and the inner protrusion back surfaces with each other in the axial direction is performed through the following procedure. First, from a state in which the male joint member and the female joint member are separated from each other, the male joint member and the female joint member are moved relative to each other in the axial direction, so that the plurality of outer protrusions pass through the circumferential-direction gaps between the plurality of inner protrusions. Subsequently, in the circular space, the plurality of outer protrusions are rotated relative to the female joint member. For example, if the male joint member is fixed, the female joint member is rotated. In this way, the outer protrusion back surfaces are opposed to the inner protrusion back surfaces. Thus, the outer protrusion back surfaces and the inner protrusion back surfaces are engaged with each other in the axial direction. That is, the male joint member and the female joint member are very easily engaged with each other in the axial direction.

(2. Assembly Method for Connector)

An assembly method for a connector according to the present invention includes: moving the male joint member and the female joint member relative to each other in the axial direction from a state in which the male joint member and the female joint member are separated from each other, so that the plurality of outer protrusions pass through the circumferential-direction gaps between the plurality of inner protrusions; and rotating the plurality of outer protrusions in the circular space relative to the female joint member, so that the outer protrusion back surfaces are opposed to the inner protrusion back surfaces.

DESCRIPTION OF EMBODIMENTS (1. Outline of Connector 1)

The outline of a connector 1 will be described with reference to FIG. 1. The connector 1 is used to connect pipes. That is, the connector 1 connects a tubular first member 2 and a tubular second member 3 and allows fluid to flow through between the first member 2 and the second member 3. In this example, the first member 2 has an internal thread to be screwed to the connector 1, and therefore is formed from metal or resin. The second member 3 is externally fitted to the connector 1 and is formed from an optional material such as metal, resin, rubber, or elastomer.

The connector 1 includes a male joint member 10 to which the first member 2 is to be connected, and a female joint member 20 to be connected to the second member 3. The male joint member and the female joint member 20 are provided so as to be attachable/detachable with each other. The male joint member 10 and the female joint member 20 are each formed in a tubular shape and allow fluid to flow through the inside thereof. The female joint member 20 is externally fitted to at least a part of the male joint member 10, so as to be engaged with the male joint member 10 in the axial direction.

Here, the male joint member 10 and the female joint member 20 have such structures that allow both members to be easily assembled with each other without using tools. That is, for the male joint member 10 and the female joint member 20, bolts or the like to be tightened using tools are not used.

The male joint member 10 and the female joint member 20 are configured to have a greater axial-direction engagement force as compared to a connector of a push-pull type (one-touch-operation type), for example. Accordingly, the connector 1 is suitable for an application that requires a great axial-direction engagement force, e.g., an application in which high-pressure fluid flows, or an application for a structure in which a great axial-direction tensile force occurs. However, attachment/detachment operation for the connector 1 is complicated as compared to a connector of a push-pull type. Accordingly, the connector 1 is suitable for an application in which attachment/detachment is performed less frequently.

(2. Components of Connector 1)

Components of the connector 1 will be described with reference to FIG. 1 to FIG. 5. The connector 1 includes the male joint member 10 and the female joint member 20. The male joint member 10 is formed in a long tubular shape as shown in FIG. 1 to FIG. 3. One end side of the male joint member 10 is connected to the first member 2, and another end side thereof is connected to the female joint member 20.

The inner circumferential surface of the male joint member 10 is formed in a cylindrical shape over the entire length in the axial direction. The male joint member 10 has, on the outer circumferential surface thereof, a first member connection portion 11 at an end to be connected to the first member 2. The first member connection portion 11 has an external thread, for example. In this case, the first member 2 which is the counterpart member has, on the inner circumferential surface thereof, an internal thread to be screwed to the external thread of the first member connection portion 11.

The male joint member 10 has, on the outer circumferential surface thereof, a flange 12 at a position adjacent to the axial-direction other end side of the first member connection portion 11 (side opposite to the first member connection portion 11). The flange 12 protrudes outward in the radial direction relative to the first member connection portion 11. The flange 12 has an anti-slip surface 12a formed in a non-circular shape on the outer circumferential surface thereof. The anti-slip surface 12a is a surface formed in a recess-projection shape in the circumferential direction, a surface formed in a polygonal shape, or a surface treated by surface processing such as knurling. The anti-slip surface 12a is formed in such a shape as to exert an anti-slip function when an operator rotates the anti-slip surface 12a held by the hand. For example, the anti-slip surface 12a is formed in a recess-projection shape divided into six sections in the circumferential direction.

The male joint member 10 has, on the outer circumferential surface thereof, a lock member external thread portion 13 at a position adjacent to the axial-direction other end side of the flange 12 (side opposite to first member connection portion 11), with an annular groove 13a interposed therebetween. The lock member external thread portion 13 has an external thread with a smaller diameter than the flange 12.

The male joint member 10 has, on the outer circumferential surface thereof, a cylindrical surface 14 with a smaller diameter than the lock member external thread portion 13, at a position adjacent to the axial-direction other end side of the lock member external thread portion 13 (side opposite to first member connection portion 11). The cylindrical surface 14 is an area where relative rotation of inner protrusions 61 of the inner rotary member 60 described later are allowed.

The male joint member 10 has, on the outer circumferential surface thereof, a plurality of outer protrusions 15 at a position adjacent to the axial-direction other end side of the cylindrical surface 14 (side opposite to first member connection portion 11). The plurality of outer protrusions 15 protrude outward in the radial direction and are formed intermittently in the circumferential direction. The plurality of outer protrusions 15 are arranged at regular intervals in the circumferential direction. Thus, a circumferential-direction gap 16 is formed between two outer protrusions 15 adjacent to each other in the circumferential direction.

The plurality of outer protrusions 15 are each formed to be tapered toward the distal end. For example, the outer protrusion 15 is formed in a trapezoidal shape as seen in the axial direction. That is, the outer protrusion 15 is formed to have a great width on the base end side and a small width on the distal end side. For example, the interval on the base end side of the circumferential-direction gap 16, i.e., the interval on the base end side of the adjacent two outer protrusions 15 is greater than the distal end width of the outer protrusion 15. However, the interval and the distal end width may be equal to each other. The interval on the distal end side of the circumferential-direction gap 16, i.e., the interval on the distal end side of the adjacent two outer protrusions 15 is greater than the base end width of the outer protrusion 15. However, the interval and the base end width may be equal to each other.

Here, of the outer protrusion 15, a surface that faces the side to which the female joint member 20 is inserted, i.e., the axial-direction other end side, is defined as outer protrusion front surface 15a. Of the outer protrusion 15, a surface on the opposite side of the outer protrusion front surface 15a, i.e., a surface that faces the side to which the first member 2 is connected, is defined as outer protrusion back surface 15b. The outer protrusion front surface 15a may be formed to be a surface parallel to a plane perpendicular to the axis of the male joint member 10, or may be formed to be a surface inclined with respect to the plane perpendicular to the axis. The same applies to the outer protrusion back surface 15b.

Six outer protrusions 15 are provided in the circumferential direction. Here, the anti-slip surface 12a of the flange 12 is formed in a recess-projection shape divided into six sections in the circumferential direction. Further, the recess-projection positions on the anti-slip surface 12a of the flange 12 correspond to the circumferential-direction positions of the outer protrusions 15. In this example, the recess part in the circumferential direction on the anti-slip surface 12a of the flange 12 corresponds to each outer protrusion 15, and the projection part in the circumferential direction on the anti-slip surface 12a of the flange 12 corresponds to each circumferential-direction gap 16 between the adjacent two outer protrusions 15.

That is, the anti-slip surface 12a of the flange 12 corresponds to the circumferential-direction positions of the outer protrusions 15, and thus serves as an indication visually recognizable from outside in a state in which a part of the male joint member 10 is fitted into the female joint member 20. Even in a state in which the outer protrusions 15 are inserted into the female joint member 20, the operator is allowed to recognize the positions of the outer protrusions 15 through visual recognition of the anti-slip surface 12a of the flange 12. Here, the indication for the circumferential-direction positions of the outer protrusions 15 is not limited to the recess-projection shape of the anti-slip surface 12a of the flange 12, and any indication provided on the anti-slip surface 12a or any indication provided on the cylindrical surface 14 may be adopted.

The male joint member 10 has, on the outer circumferential surface thereof, a distal end cylindrical surface 17 with a smaller diameter than the outer protrusions 15, at a position adjacent to the axial-direction other end side of the outer protrusions 15 (side opposite to first member connection portion 11). The distal end cylindrical surface 17 forms a seal surface to be in contact with an annular seal member 70 described later.

Figure 1:
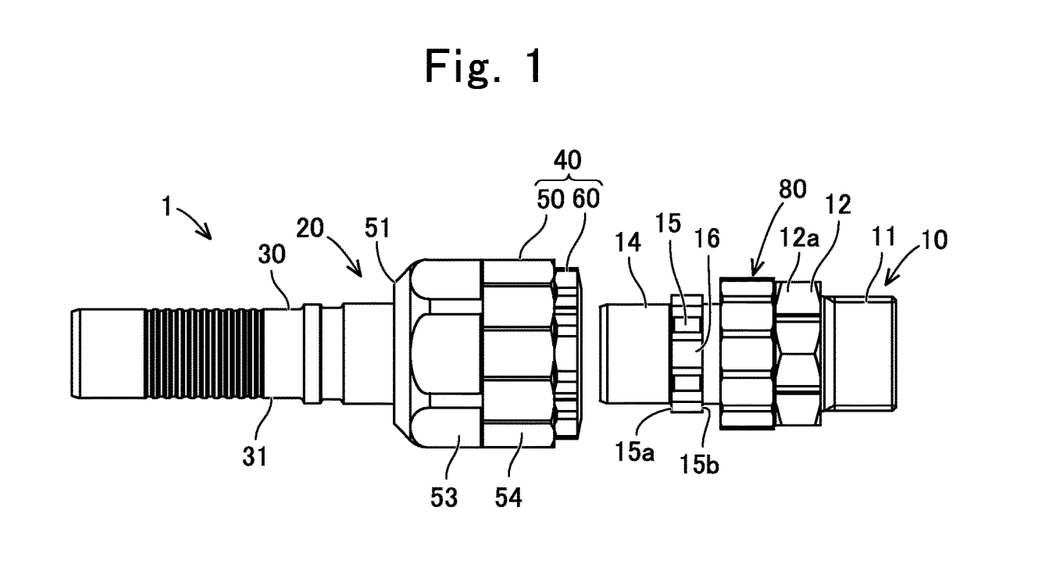
FIG. 1 is a side view of a connector and shows an initial set step before a male joint member and a female joint member are assembled with each other.
Figure 2:
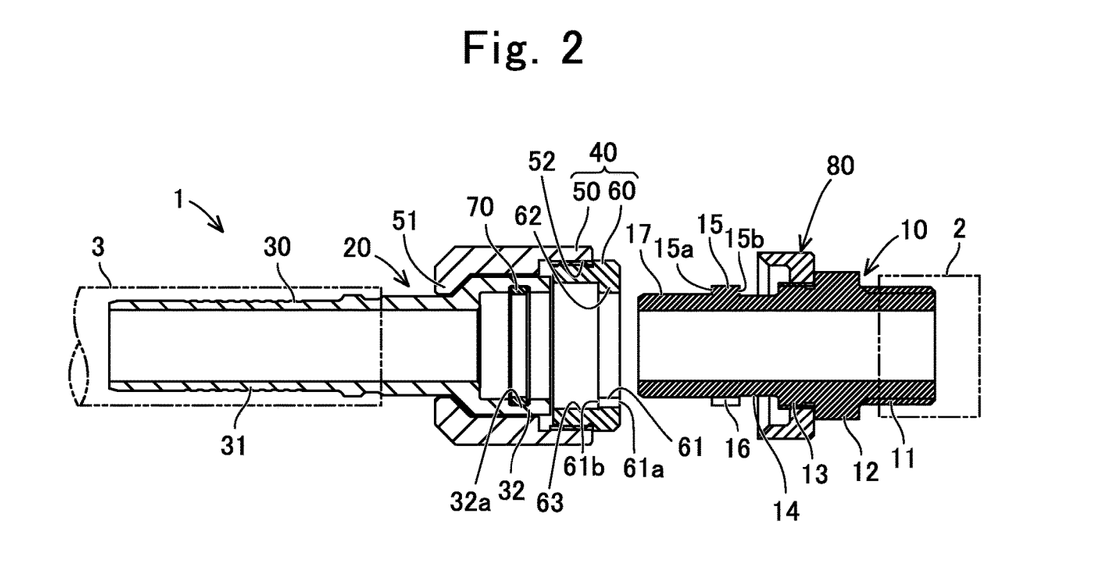
FIG. 2 is an axial-direction sectional view of the connector in the initial set step corresponding to FIG. 1.
Figure 3:
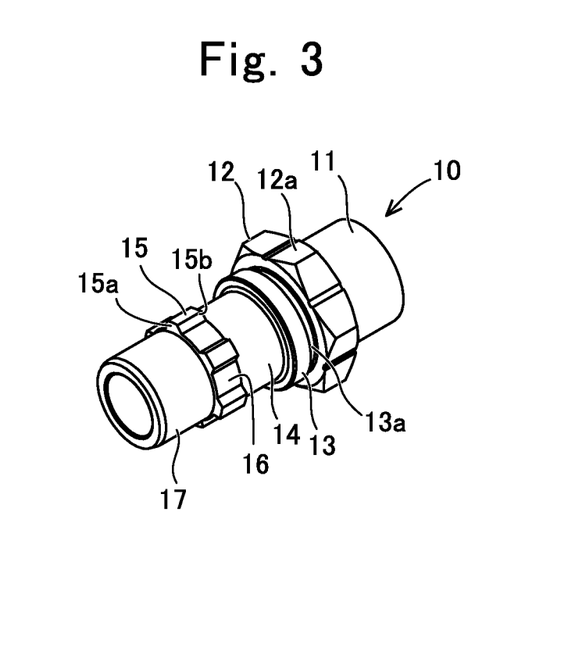
FIG. 3 is a perspective view of the male joint member.

The female joint member 20 is formed in a long tubular shape as a whole, as shown in FIG. 1 and FIG. 2. One end side of the female joint member 20 is connected to the second member 3, and another end side thereof is externally fitted to a part of the male joint member 10.

In this example, as shown in FIG. 1 and FIG. 2, the female joint member 20 includes a female main member 30 and a female rotary member 40 formed as separate members. Further, the female rotary member 40 includes an outer rotary member 50 and the inner rotary member 60 formed as separate members. However, the female main member 30 and the female rotary member 40 are not limited to separate members, and may be formed as an integrated member. In addition, the outer rotary member 50 and the inner rotary member 60 are not limited to separate members, and may be formed as an integrated member. Hereinafter, components of the female joint member 20 in this example will be described.

The female main member 30 is formed in a long tubular shape and is connected to the second member 3. The female main member 30 includes a small-diameter tube portion 31 to be connected to the second member 3, and a large-diameter tube portion 32 to be fitted to the distal end cylindrical surface 17 on the outer circumferential surface of the male joint member 10.

The inner circumferential surface of the small-diameter tube portion 31 is formed in a cylindrical shape, and the outer circumferential surface thereof is formed in a recess-projection shape in the axial direction. Since the second member 3 is fitted to the outer circumferential surface of the small-diameter tube portion 31, the recess-projection shape of the outer circumferential surface of the small-diameter tube portion 31 provides an engagement force in the axial direction. The inner diameter of the small-diameter tube portion 31 is equal to the diameter of the inner circumferential surface of the male joint member 10. Therefore, an end surface of the small-diameter tube portion 31 on the side opposite to the side to which the second member 3 is inserted is opposed to an end surface of the male joint member 10.

The large-diameter tube portion 32 is connected to an end of the small-diameter tube portion 31 on the side opposite to the side to which the second member 3 is inserted, and is formed to have a larger diameter than the small-diameter tube portion 31. The inner diameter of the large-diameter tube portion 32 is slightly larger than the outer diameter of the distal end cylindrical surface 17 of the male joint member 10. Further, the inner diameter of the large-diameter tube portion 32 is smaller than a circumscribed circle diameter of the outer protrusions 15 of the male joint member 10. That is, while the large-diameter tube portion 32 allows the distal end cylindrical surface 17 part to be inserted therein, the large-diameter tube portion 32 interferes with the outer protrusions 15 in the axial direction.

An annular groove 32a is formed at a center part in the axial direction on the inner circumferential surface of the large-diameter tube portion 32. An end surface of the large-diameter tube portion 32 on the small-diameter tube portion 31 side is formed in a taper shape. On the other hand, an end surface of the large-diameter tube portion 32 on the side opposite to the small-diameter tube portion 31 forms an opening and is formed to have a surface parallel to a plane perpendicular to the axis of the female main member 30.

However, both end surfaces of the large-diameter tube portion 32 may be formed in optional shapes.

As shown in FIG. 1 and FIG. 2, the female rotary member 40 is formed in a tubular shape and is externally fitted to the female main member 30 so as to be rotatable relative to the female main member 30. Further, the female rotary member 40 is engaged in the axial direction with the large-diameter tube portion 32 of the female main member 30. The female rotary member 40 includes the outer rotary member 50 and the inner rotary member 60 as described above.

As shown in FIG. 1 and FIG. 2, the outer rotary member 50 is formed in a tubular shape and is externally fitted to the large-diameter tube portion 32 of the female main member 30 so as to be rotatable relative to the large-diameter tube portion 32. The outer rotary member 50 has a flange 51 protruding inward in the radial direction, on one end side (left side in FIGS. 1 and 2). The flange 51 is engaged with the end surface of the large-diameter tube portion 32 on the small-diameter tube portion 31 side, toward one side in the axial direction. The flange 51 is formed in a taper shape so as to correspond to the tapered end surface of the large-diameter tube portion 32.

The outer rotary member 50 has an internal thread 52 on another end side (right side in FIGS. 1 and 2) on the inner circumferential surface thereof. The internal thread 52 has a larger diameter than the diameter of an inner circumferential surface, of the outer rotary member 50, opposed to the large-diameter tube portion 32 in the radial direction. Further, as shown in FIG. 1, the outer circumferential surface of the outer rotary member 50 is formed in a non-circular shape. The outer circumferential surface of the outer rotary member is a surface formed in a recess-projection shape in the circumferential direction, a surface formed in a polygonal shape, or a surface treated by surface processing such as knurling. The outer circumferential surface of the outer rotary member 50 is formed in such a shape as to exert an anti-slip function when the operator rotates the outer rotary member 50 held by the hand. The outer circumferential surface of the outer rotary member 50 is formed in a shape different between a part 53 on the flange 51 side and a part on a side opposite to the flange 51. However, the outer circumferential surfaces 53, 54 may be formed in the same shape.

Figure 4:
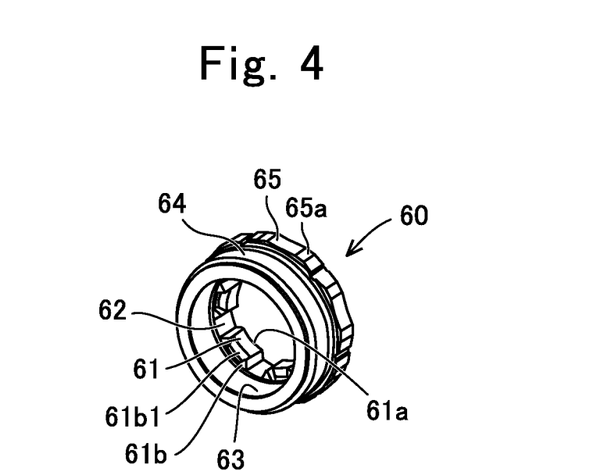
FIG. 4 is a perspective view of an inner rotary member which is a component of the female joint member.
Figure 5:
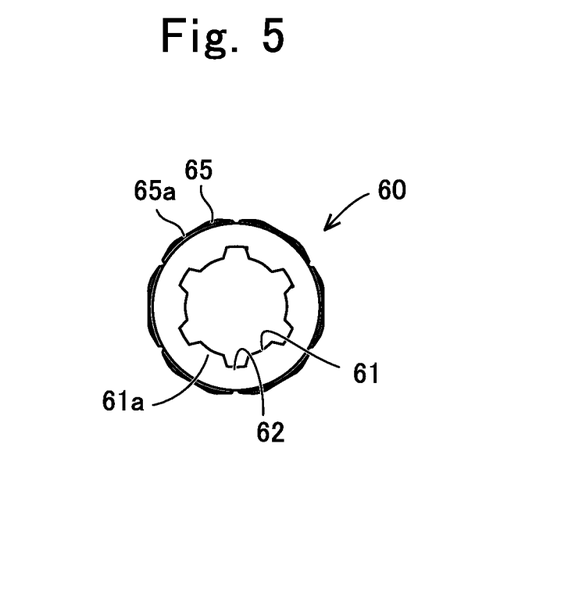
FIG. 5 is a view of the inner rotary member as seen in the axial direction from the right back side in FIG. 4.
Figure 6:
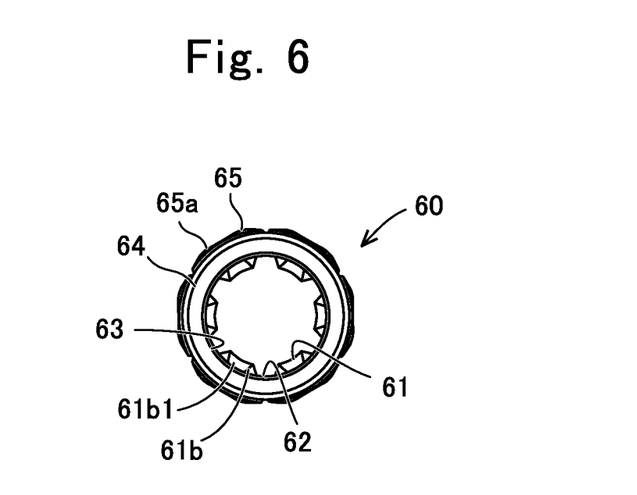
FIG. 6 is a view of the inner rotary member as seen in the axial direction from the left front side in FIG. 4.

The inner rotary member 60 will be described with reference to FIG. 4 to FIG. 6. The inner rotary member 60 is formed in a tubular shape. The inner rotary member 60 has a plurality of inner protrusions 61 on one end side on the inner circumferential surface thereof. The plurality of inner protrusions 61 are located at an opening part on the side to which the male joint member 10 is inserted in the female joint member 20.

The plurality of inner protrusions 61 protrude inward in the radial direction and are formed intermittently in the circumferential direction. The plurality of inner protrusions 61 are arranged at regular intervals in the circumferential direction. Therefore, a circumferential-direction gap 62 is formed between two inner protrusions 61 adjacent to each other in the circumferential direction.

The number of the plurality of inner protrusions 61 is the same as the number of the outer protrusions 15 of the male joint member 10. In this example, six inner protrusions 61 are formed. The inner protrusions 61 are each formed in such a shape as to be allowed to pass through the circumferential-direction gap 16 between the adjacent two outer protrusions 15. Further, the circumferential-direction gap 62 between the adjacent two inner protrusions 61 is formed in such a shape as to allow each outer protrusion 15 to pass therethrough.

Therefore, the plurality of inner protrusions 61 are each formed to be tapered toward the distal end. For example, the inner protrusion 61 is formed in a trapezoidal shape as seen in the axial direction. That is, the inner protrusion 61 is formed to have a great width on the base end side and a small width on the distal end side. For example, the interval on the base end side of the circumferential-direction gap 62, i.e., the interval on the base end side of the adjacent two inner protrusions 61 is greater than the distal end width of the inner protrusion 61. However, the interval and the distal end width may be equal to each other. The interval on the distal end side of the circumferential-direction gap 62, i.e., the interval on the distal end side of the adjacent two inner protrusions 61 is greater than the base end width of the inner protrusion 61. However, the interval and the base end width may be equal to each other.

Here, of the inner protrusion 61, a surface that faces the side to which the male joint member 10 is inserted is defined as inner protrusion front surface 61a. Of the inner protrusion 61, a surface on the opposite side of the inner protrusion front surface 61a, i.e., a surface that faces the second member 3 side, is defined as inner protrusion back surface 61b. The inner protrusion front surface 61a may be formed to be a surface parallel to a plane perpendicular to the axis of the female joint member 20, or may be formed to be a surface inclined with respect to the plane perpendicular to the axis.

The inner protrusion back surface 61b forms a surface to be engaged in the axial direction with the outer protrusion back surface 15b of the outer protrusion 15. Accordingly, the inner protrusion back surface 61b has an engagement portion 61b1 to be engaged in the circumferential direction with the outer protrusion back surface 15b in a state in which the inner protrusion back surface 61b is engaged in the axial direction with the outer protrusion back surface 15b. In this example, the engagement portion 61b1 is a recess formed in a shape corresponding to the outer protrusion back surface 15b. That is, the engagement portion 61b1 is formed in a trapezoidal shape, the long side of the trapezoid shape is located on the distal end side of the inner protrusion 61, and the short side of the trapezoidal shape is located on the base end side of the inner protrusion 61. In particular, since the outer protrusions 15 and the inner protrusions 61 are formed in trapezoidal shapes, the outer protrusions 15 and the inner protrusions 61 are allowed to mutually pass through and the engagement portion 61b1 of each inner protrusion back surface 61b is assuredly provided. In this example, the inner protrusion back surface 61b has the engagement portion 61b1 which is a recess, but instead, the outer protrusion back surface 15b may have such an engagement portion which is a recess.

The inner rotary member 60 has a circular space 63 on the end side opposite to the inner protrusions 61, on the inner circumferential surface thereof. The inner circumferential surface of the circular space 63 is formed in a cylindrical shape. The circular space 63 is formed in an area opposed to the inner protrusion back surfaces 61b. That is, the inner diameter of the circular space 63 is equal to or greater than the diameter of the base ends of the inner protrusions 61, i.e., is greater than the circumscribed circle diameter of the outer protrusions 15. That is, the circular space 63 allows the outer protrusions 15 to rotate relatively.

The outer circumferential surface of the inner rotary member 60 has an external thread 64 at an end on the circular space 63 side. The external thread 64 is screwed to the internal thread 52 of the outer rotary member 50. Therefore, the inner rotary member 60 is connected to the inner circumferential side of the outer rotary member 50 so as to be rotatable integrally with the outer rotary member 50. Further, the inner rotary member 60 is engaged, toward the other side in the axial direction, with the end surface of the large-diameter tube portion 32 of the female main member 30 on the side opposite to the small-diameter tube portion 31. That is, the inner rotary member 60 and the flange 51 of the outer rotary member 50 sandwich the large-diameter tube portion 32 of the female main member 30 from both sides.

The inner rotary member 60 has a flange 65 at an end on the inner protrusion 61 side on the outer circumferential surface thereof. The flange 65 protrudes outward in the radial direction relative to the external thread 64. The outer circumferential corner portion of the flange 65 is formed in a taper shape. The flange 65 has an anti-slip surface 65a formed in a non-circular shape on the outer circumferential surface thereof. The anti-slip surface 65a is a surface formed in a recess-projection shape in the circumferential direction, a surface formed in a polygonal shape, or a surface treated by surface processing such as knurling. The anti-slip surface 65a is formed in such a shape as to exert an anti-slip function when the operator rotates the anti-slip surface 65a held by the hand.

For example, the anti-slip surface 65a of the flange 65 is formed in a recess-projection shape divided into six sections in the circumferential direction. The recess-projection positions on the anti-slip surface 65a correspond to the circumferential-direction positions of the inner protrusions 61. In this example, the recess part in the circumferential direction on the anti-slip surface 65a of the flange 65 corresponds to each inner protrusion 61, and the projection part in the circumferential direction on the anti-slip surface 65a of the flange 65 corresponds to each circumferential-direction gap 62 between the adjacent two inner protrusions 61.

That is, the anti-slip surface 65a of the flange 65 corresponds to the circumferential-direction positions of the inner protrusions 61, and thus serves as an indication visually recognizable from outside. Therefore, even though the inner protrusions 61 are not visible from outside, the operator is allowed to recognize the positions of the inner protrusions 61 through visual recognition of the anti-slip surface 65a of the flange 65. Here, the indication for the circumferential-direction positions of the inner protrusions 61 is not limited to the recess-projection shape of the anti-slip surface 65a of the flange 65, and any indication provided on the anti-slip surface 65a may be adopted.

Thus, the anti-slip surface 12a serves as an indication for the circumferential-direction positions of the outer protrusions 15, and the anti-slip surface 65a serves as an indication for the circumferential-direction positions of the inner protrusions 61. Therefore, the operator is allowed to recognize whether the outer protrusions 15 and the inner protrusions 61 are engaged with each other in the axial direction or allowed to be pulled from each other. In particular, in this example, the recess-projection shape of the anti-slip surface 65a of the flange 65 of the inner rotary member 60 and the recess-projection shape of the anti-slip surface 12a of the flange 12 of the male joint member 10 are formed as indications in the same shape. This allows the operator to easily recognize the states of the outer protrusions 15 and the inner protrusions 61.

As shown in FIG. 2, the annular seal member 70 is held between the distal end cylindrical surface 17 of the outer circumferential surface of the male joint member 10 and the inner circumferential surface of the female main member 30, and thus prevents fluid flowing inside from leaking to the outside. More specifically, the annular seal member 70 is fitted into the annular groove 32a of the large-diameter tube portion 32 of the female main member 30, and is held between the bottom surface of the annular groove 32a and the distal end cylindrical surface 17 of the male joint member 10.

In this example, the annular seal member 70 is composed of an O ring and two back-up rings. Therefore, the annular seal member 70 prevents inside fluid from leaking to the outside, and prevents outside dust from entering the inside.

A lock member 80 is provided on the outer circumferential surface of the male joint member 10, and is contactable with the axial-direction end surface of the female joint member 20, thus restricting the female joint member 20 from moving toward the first member 2 side. As shown in FIG. 1 and FIG. 2, the lock member 80 is a locknut formed in an annular shape and having an internal thread. However, as long as the lock member 80 has such a restricting function, the lock member 80 may be formed in another shape without being limited to a locknut. For example, the lock member 80 may be a screw, a clip, a pin, or the like. In this case, the lock member 80 is engaged with the male joint member 10 and the female joint member 20.

In this example, the lock member 80 which is a locknut has an L shape in the cross section along the axial direction. An internal thread is formed at one end of the L shape. The lock member 80 is provided on the outer circumferential surface of the male joint member 10, and is screwed to the lock member external thread portion 13 formed on the outer circumferential surface of the male joint member 10. In FIG. 1 and FIG. 2, the lock member 80 is in a state of being located on the flange 12 side on the lock member external thread portion 13.

Another end of the L shape of the lock member 80 is located on the side to which the female joint member 20 is inserted. The other end of the L shape is opposed to the outer circumferential corner portion of the inner rotary member 60 in the axial direction. Further, the other end of the L shape is formed in a taper shape parallel to the taper of the outer circumferential corner portion of the inner rotary member 60. As shown in FIG. 1, the lock member 80 is formed in a recess-projection shape in the circumferential direction. The outer circumferential surface of the lock member 80 is formed in such a shape as to exert an anti-slip function when the operator rotates the lock member 80 held by the hand. The outer circumferential surface of the lock member 80 is not limited to the recess-projection shape, and may be formed in a polygonal shape or treated by surface processing such as knurling so as to exert an anti-slip function.

(3. Assembly Method for Connector 1)

An assembly method for the connector 1 will be described with reference to FIG. 2 and FIG. 7 to FIG. 10. It is noted that a detachment method for the connector 1 is performed through a procedure reverse to the assembly method. First, in an initial set step for the connector 1, the connector 1 is made into an initial set state as shown in FIG. 2. In the initial set state of the connector 1, the male joint member 10 is connected to the first member 2 and the female main member 30 of the female joint member 20 is connected to the second member 3.

Further, in the initial set step, in the female joint member 20, the outer rotary member 50 and the inner rotary member 60 are attached to the female main member 30. An assembly method for the female joint member 20 is as follows.

First, the outer rotary member 50 is inserted from the small-diameter tube portion 31 side of the female main member 30, so that the flange 51 of the outer rotary member 50 is located near the large-diameter tube portion 32. In this state, the internal thread 52 of the outer rotary member 50 protrudes toward the male joint member 10 relative to the large-diameter tube portion 32. Subsequently, the inner rotary member 60 is placed on the inner side of the outer rotary member 50 from a side of the large-diameter tube portion 32 opposite to the small-diameter tube portion 31. Then, the external thread 64 of the inner rotary member 60 is screwed to the internal thread 52 of the outer rotary member 50.

Thus, the large-diameter tube portion 32 comes into a state of being sandwiched between the flange 51 of the outer rotary member 50 and the inner rotary member 60. At this time, a slight gap is formed between the large-diameter tube portion 32 and the flange 51 of the outer rotary member 50, and a slight gap is formed between the large-diameter tube portion 32 and the inner rotary member 60. Therefore, the outer rotary member 50 and the inner rotary member 60 are rotatable relative to the female main member 30.

Further, in the initial set step, the annular seal member 70 is fitted into the annular groove 32a of the female main member 30. Further, the lock member 80 is screwed to the lock member external thread portion 13 of the male joint member 10. At this time, the lock member 80 is brought into contact with the flange 12 or is spaced by a slight gap from the flange 12.

Figure 7:
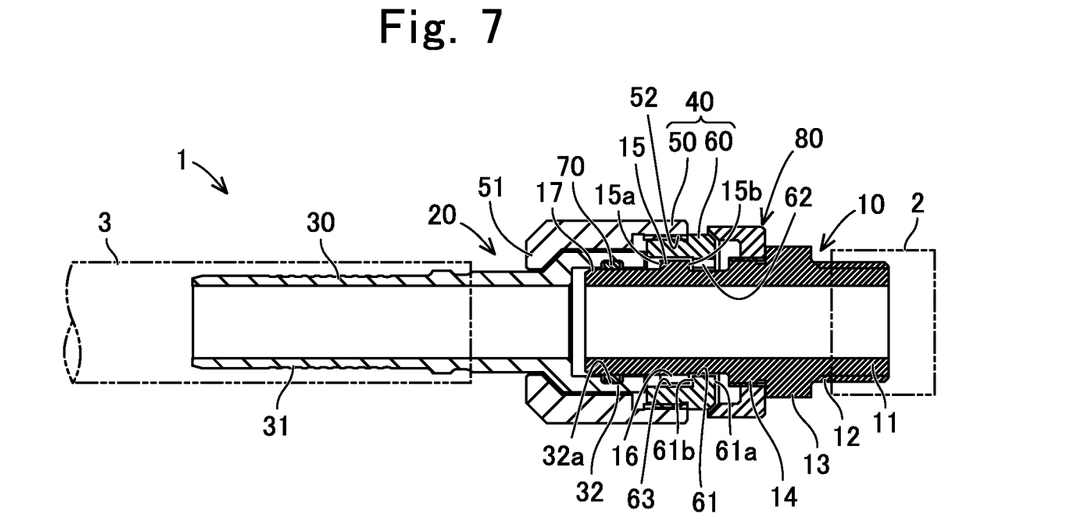
FIG. 7 is an axial-direction sectional view of the connector in an insertion step.

In an insertion step subsequent to the initial set step, the male joint member 10 and the female joint member 20 are moved relative to each other in the axial direction from the state in which the male joint member 10 and the female joint member 20 are separated from each other as shown in FIG. 2. Thus, as shown in FIG. 7, a part of the male joint member 10 is inserted to the inner side of the female joint member 20.

More specifically, the outer protrusions 15 and the inner protrusions 61 are positioned at positions shifted from each other in the circumferential direction. That is, each outer protrusion 15 is at a position opposed to the circumferential-direction gap 62 between the adjacent two inner protrusions 61, and each inner protrusion 61 is at a position opposed to the circumferential-direction gap 16 between the adjacent two outer protrusions 15. In this state, the male joint member 10 and the female joint member 20 are moved relative to each other in the axial direction, so that the outer protrusions 15 pass through the circumferential-direction gaps 62 between the inner protrusions 61, and the inner protrusions 61 pass through the circumferential-direction gaps 16 between the outer protrusions 15.

Then, the outer protrusions 15 are set to be located at the circular space 63 of the inner rotary member 60. Since the outer protrusions 15 and the inner rotary member 60 are allowed to rotate relative to each other in the circular space, the male joint member 10 and the inner rotary member 60 are rotatable relative to each other. At this time, the annular seal member 70 is in contact with the distal end cylindrical surface 17 of the male joint member 10. In addition, in this state, the lock member 80 is separate from the inner rotary member 60.

Figure 8:
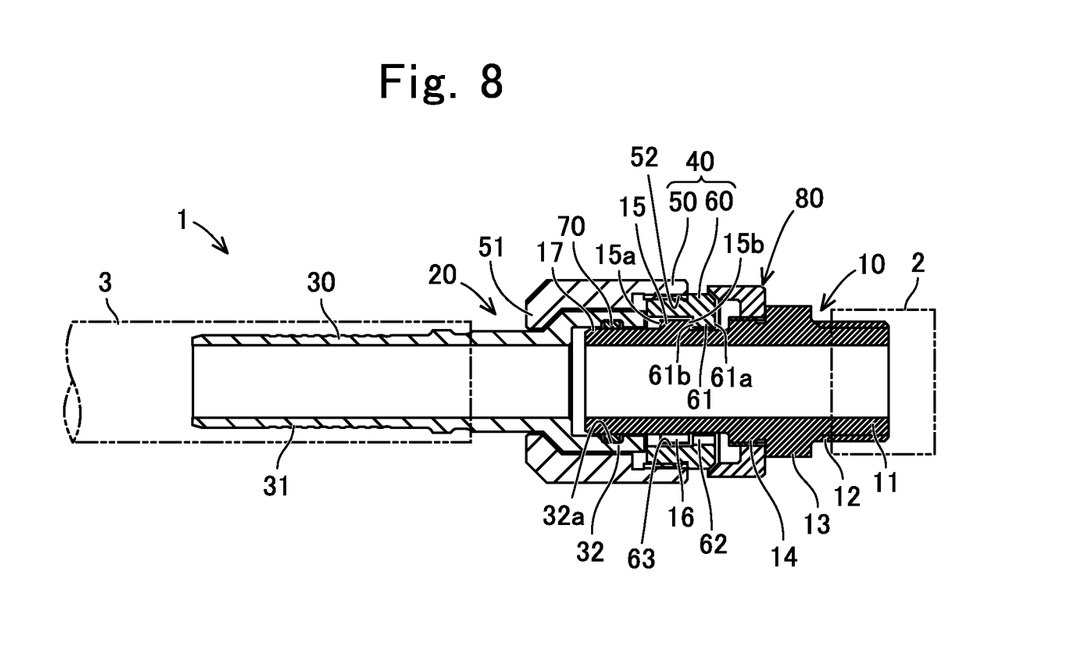
FIG. 8 is an axial-direction sectional view of the connector in a rotation step.

In a rotation step subsequent to the insertion step, as shown in FIG. 8, the outer rotary member 50 and the inner rotary member 60 are rotated relative to the male joint member 10. At this time, the female main member 30 is not rotated while the outer rotary member 50 and the inner rotary member 60 are rotated.

Then, the inner protrusion back surface 61b of each inner protrusions 61 and the outer protrusion back surface 15b of each outer protrusion 15 are set to be opposed to each other. Here, since the inner protrusions 61 and the outer protrusions 15 are present inside the outer rotary member 50 and the inner rotary member 60, the inner protrusions 61 and the outer protrusions 15 are not visible to the operator.

Accordingly, through visual recognition of the anti-slip surface 12a of the flange 12 of the male joint member 10 and the anti-slip surface 65a of the flange 65 of the inner rotary member 60, the operator performs aligning of the outer protrusions 15 and the inner protrusions 61. In this example, the grooves on the anti-slip surface 12a of the flange 12 and the grooves on the anti-slip surface 65a of the flange 65 are aligned with each other.

Figure 9:
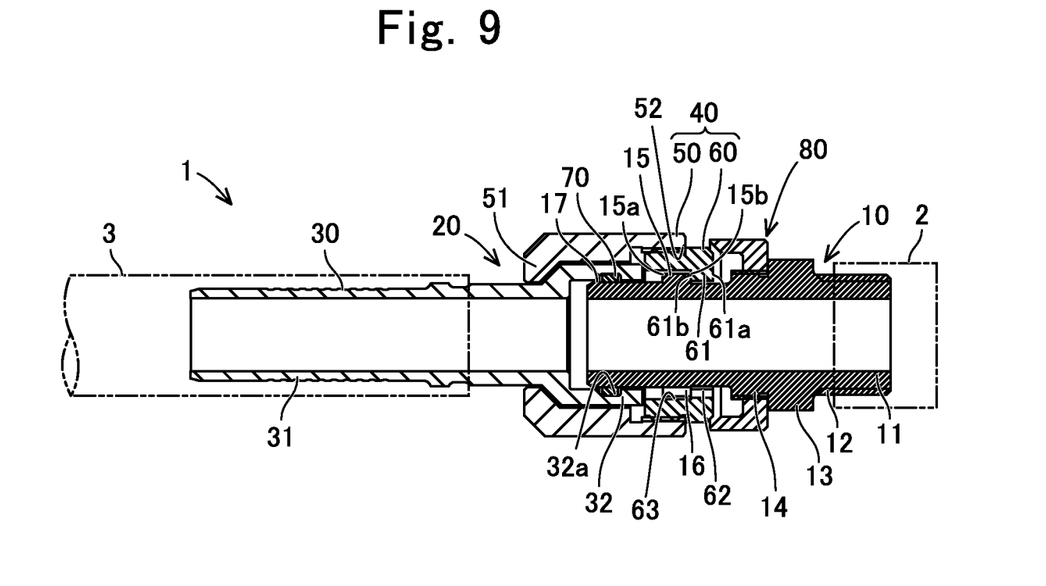
FIG. 9 is an axial-direction sectional view of the connector in a back surface abutting step.

In a back surface abutting step subsequent to the rotation step, as shown in FIG. 9, the outer protrusion back surfaces 15b and the inner protrusion back surfaces 61b are caused to abut on each other so that the outer protrusion back surfaces 15b and the inner protrusion back surfaces 61b come into contact with each other. Here, in each inner protrusion back surface 61b, the engagement portion 61b1 which is a recess is formed. The engagement portion 61b1 which is a recess has a shape corresponding to the outer protrusion 15. Therefore, the outer protrusion back surface 15b comes into contact with the engagement portion 61b1 which is a recess in the inner protrusion back surface 61b. Thus, the outer protrusion 15 is engaged with the engagement portion 61b1 which is a recess, in the axial direction and also in the circumferential direction.

Figure 10:
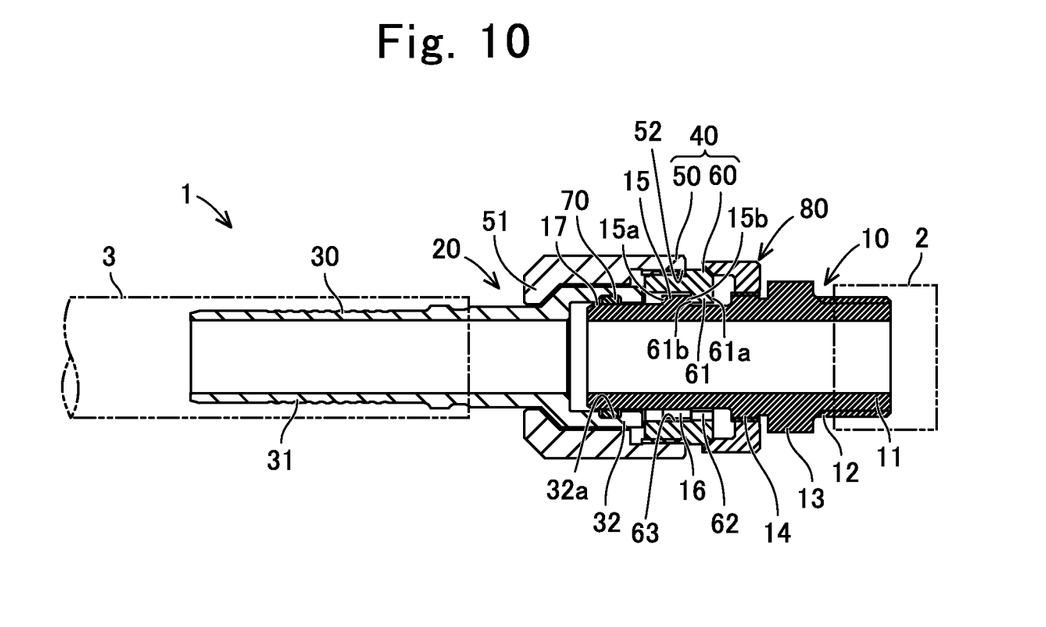
FIG. 10 is an axial-direction sectional view of the connector in a locking step.

In a locking step subsequent to the back surface abutting step, as shown in FIG. 10, the lock member 80 is moved. More specifically, the lock member 80 is rotated to move toward the inner rotary member 60 side. Then, the tapered end surface of the L shape of the lock member 80 is pressed against the outer circumferential corner portion of the flange 65 of the inner rotary member 60. In this way, the lock member 80 is positioned at a predetermined position, whereby the outer protrusion back surfaces 15b and the inner protrusion back surfaces 61b are made into contact with each other.

(4. Effects)

By the inner protrusion back surfaces 61b being engaged in the axial direction with the outer protrusion back surfaces 15b, the male joint member 10 and the female joint member 20 are engaged with each other in the axial direction. That is, the male joint member 10 and the female joint member 20 are directly engaged with each other not via another member such as a stopper. Thus, the connector 1 produces a great engagement force. In particular, the plurality of outer protrusions 15 and the plurality of inner protrusions 61 are formed at regular intervals in the circumferential direction. Thus, the engagement force is produced equally in the circumferential direction, whereby a stable engagement force is obtained.

Operation for engaging the outer protrusion back surfaces 15b and the inner protrusion back surfaces 61b with each other in the axial direction is performed through the procedure described in the above assembly method. Thus, the male joint member 10 and the female joint member 20 are very easily engaged with each other in the axial direction.

In order to engage the outer protrusion back surfaces 15b and the inner protrusion back surfaces 61b with each other, the outer protrusions 15 need to be relatively rotated in the circular space 63. That is, in this example, since the male joint member 10 is fixed, the outer rotary member 50 and the inner rotary member 60 need to be rotated relative to the male joint member 10. Here, the outer rotary member 50 and the inner rotary member 60 are rotatable relative to the female main member 30.

Therefore, while the outer rotary member 50 and the inner rotary member 60 are rotated relative to the male joint member 10, the female main member 30 need not be rotated. As a result, the outer protrusions 15 and the inner protrusions 61 are engaged with each other without rotating the first member 2 connected to the male joint member 10 and the second member 3 connected to the female main member 30. That is, the first member 2 and the second member 3 are prevented from being twisted.

The female rotary member 40 (outer rotary member 50 and inner rotary member 60) is rotatable relative to the female main member 30. That is, the female main member 30 and the female rotary member 40 are separate members. However, the female main member 30 and the female rotary member 40 need to be engaged with each other in the axial direction. Further, the female main member 30 and the female rotary member 40 need to have structures that allow the female main member 30 and the female rotary member 40 to be assembled so as to be engaged with each other.

Accordingly, the female rotary member 40 includes the outer rotary member 50 and the inner rotary member 60. The outer rotary member 50 is engaged with the large-diameter tube portion 32 of the female main member 30 toward one side in the axial direction, and the inner rotary member 60 is engaged with the large-diameter tube portion 32 of the female main member 30 toward the other side in the axial direction. That is, the outer rotary member 50 and the inner rotary member 60 are located so as to sandwich the large-diameter tube portion 32 in the axial direction. Thus, the outer rotary member 50 and the inner rotary member 60 are easily attached to the female main member 30, so as to be rotatable relative to the female main member 30 and be engaged in the axial direction with the female main member 30.

Further, the annular seal member 70 is held between the distal end cylindrical surface 17 of the male joint member 10 and the inner circumferential surface of the female main member 30. That is, the annular seal member 70 is located between the members that do not rotate, whereby high sealing performance is ensured.

Further, the inner protrusion back surface 61b has the engagement portion 61b1 to be engaged in the circumferential direction with the outer protrusion back surface 15b, whereby the male joint member 10 and the female joint member 20 are engaged with each other more reliably.

The outer protrusion 15 and the inner protrusion 61 are formed in shapes tapered toward the distal ends. The engagement portion 61b1 is a recess formed in the shape corresponding to the outer protrusion back surface 15b. Therefore, even though the engagement portion 61b1 which is a recess is formed, the outer protrusion 15 and the inner protrusion 61 are allowed to be as large as possible. That is, since the engagement areas of the outer protrusion 15 and the inner protrusion 61 are made large, a great engagement force is produced.

The lock member 80 restricts the female joint member 20 from moving toward the first member 2 side relative to the male joint member 10. Thus, engagement between the outer protrusions 15 and the inner protrusions 61 is kept. Here, the engagement force between the outer protrusions 15 and the inner protrusions 61 acts against a pulling force acting on the male joint member 10 and the female joint member 20. On the other hand, a force acting on the lock member 80 has a direction opposite to the direction against the pulling force. Thus, the pulling force does not act on the lock member 80. Therefore, the lock member 80 is allowed to have a simple structure.

Further, the lock member 80 is formed in an annular shape, thus coming into contact with the male joint member 10 over the entire circumference and with the inner rotary member 60 of the female joint member 20 over the entire circumference. Thus, the lock member 80 covers between the inner rotary member 60 and the outer circumferential surface of the male joint member 10. That is, the lock member 80 inhibits dust from entering the inside of the inner rotary member 60. It is noted that contact between the lock member 80 which is a locknut and the male joint member 10 is made via thread parts.

The flange 12 of the male joint member 10, the outer rotary member 50, the flange 65 of the inner rotary member 60, and the lock member 80 have outer circumferential surfaces that exert anti-slip functions. This allows the operator to easily perform assembly without using a tool.

What is claimed is:

1. A connector comprising:
   a male joint member to be connected to a first member, the male joint member being formed in a tubular shape so as to allow fluid to flow therein; and
   a female joint member to be connected to a second member, the female joint member being formed in a tubular shape so as to allow fluid to flow therein, the female joint member being configured to be externally fitted to at least a part of the male joint member and engaged in an axial direction with the male joint member, wherein
   the male joint member has, on an outer circumferential surface thereof, a plurality of outer protrusions protruding outward in a radial direction and formed intermittently in a circumferential direction,
   the female joint member has, on an inner circumferential surface thereof, a plurality of inner protrusions protruding inward in the radial direction and formed intermittently in the circumferential direction,
   of each outer protrusion, a surface on a side to which the female joint member is inserted is defined as an outer protrusion front surface, and a surface on an opposite side of the outer protrusion front surface is defined as an outer protrusion back surface,
   of each inner protrusion, a surface on a side to which the male joint member is inserted is defined as an inner protrusion front surface, and a surface on an opposite side of the inner protrusion front surface is defined as an inner protrusion back surface,
   a circumferential-direction gap between adjacent two of the inner protrusions is formed so as to allow each outer protrusion to pass therethrough,
   the female joint member has, in an area opposed to the inner protrusion back surfaces, a circular space that allows the plurality of outer protrusions to relatively rotate therein,
   the inner protrusion back surfaces of the plurality of inner protrusions are engaged in the axial direction with the outer protrusion back surfaces of the plurality of outer protrusions that have passed through the circumferential-direction gaps of the plurality of inner protrusions,
   the circular space is formed in a cylindrical shape such that the plurality of outer protrusions can pass through the circumferential-direction gaps and then relatively rotate to either side in the circumferential direction; and
   wherein the female joint member includes:

a female main member having a small-diameter tube portion to be connected to the second member, and a large-diameter tube portion to be fitted to at least a part of the outer circumferential surface of the male joint member, and a female rotary member formed in a tubular shape and externally fitted to the female main member so as to be rotatable relative to the female main member, the female rotary member being engaged in the axial direction with the large-diameter tube portion of the female main member and having the plurality of inner protrusions.

2. The connector according to claim 1, wherein the female rotary member includes an outer rotary member formed in a tubular shape and externally fitted to the female main member so as to be rotatable relative to the female main member, the outer rotary member being engaged with the large-diameter tube portion of the female main member toward one side in the axial direction, and an inner rotary member formed in a tubular shape and connected to an inner circumferential side of the outer rotary member so as to be rotatable integrally with the outer rotary member, the inner rotary member being engaged with the large-diameter tube portion of the female main member toward another side in the axial direction and having the plurality of inner protrusions.

3. The connector according to claim 1, further comprising an annular seal member held between the outer circumferential surface of the male joint member and the inner circumferential surface of the female main member.

4. The connector according to claim 1, wherein one of the outer protrusion back surface and the inner protrusion back surface has an engagement portion to be engaged in the circumferential direction with another of the outer protrusion back surface and the inner protrusion back surface in a state in which the outer protrusion back surface and the inner protrusion back surface are engaged with each other in the axial direction.

5. The connector according to claim 4, wherein the outer protrusion and the inner protrusion are each formed in a shape tapered toward a distal end thereof, and the engagement portion is a recess formed in a shape corresponding to the other of the outer protrusion back surface and the inner protrusion back surface.

6. The connector according to claim 1, wherein the plurality of outer protrusions and the plurality of inner protrusions are formed at regular intervals in the circumferential direction.

7. The connector according to claim 1, further comprising a lock member provided at the outer circumferential surface of the male joint member and coming into contact with an axial-direction end surface of the female joint member so as to restrict the female joint member from moving toward a first member side.

8. The connector according to claim 7, wherein the male joint member has an external thread on the outer circumferential surface thereof, and the lock member is a locknut screwed to the external thread formed on the outer circumferential surface of the male joint member.

9. The connector according to claim 7, wherein the lock member is formed in an annular shape, and comes into contact with the male joint member over an entire circumference thereof and with the female joint member over an entire circumference thereof, so as to cover between the male joint member and the female joint member.

10. The connector according to claim 8, wherein the lock member has an anti-slip surface formed in a non-circular shape on an outer circumferential surface thereof.

11. The connector according to claim 1, wherein the female joint member has an anti-slip surface formed in a non-circular shape on an outer circumferential surface thereof.

12. The connector according to claim 1, wherein the male joint member further has an indication corresponding to a circumferential-direction position of the outer protrusion, the indication being visually recognizable from outside in a state in which the female joint member is externally fitted to a part of the male joint member, and the female joint member further has an indication corresponding to a circumferential-direction position of the inner protrusion, the indication being visually recognizable from outside.

13. An assembly method for the connector according to claim 1, the assembly method comprising:

moving the male joint member and the female joint member relative to each other in the axial direction from a state in which the male joint member and the female joint member are separated from each other, so that the plurality of outer protrusions pass through the circumferential-direction gaps between the plurality of inner protrusions; and rotating the plurality of outer protrusions relatively in the circular space, so that the outer protrusion back surfaces are opposed to the inner protrusion back surfaces.

14. An assembly method for the connector according to claim 7, the assembly method comprising:

moving the male joint member and the female joint member relative to each other in the axial direction from a state in which the male joint member and the female joint member are separated from each other, so that the plurality of outer protrusions pass through the circumferential-direction gaps between the plurality of inner protrusions;

rotating the plurality of outer protrusions relatively in the circular space, so that the outer protrusion back surfaces are opposed to the inner protrusion back surfaces; and positioning the lock member at a predetermined position so that the outer protrusion back surfaces and the inner protrusion back surfaces come into contact with each other.

* * * * *